US008438382B2

(12) United States Patent
Ferg et al.

(10) Patent No.: US 8,438,382 B2
(45) Date of Patent: May 7, 2013

(54) CREDENTIAL MANAGEMENT SYSTEM AND METHOD

(75) Inventors: Barry Ferg, North Vancouver (CA); Gary Krall, Saratoga, CA (US); David M'Raihi, San Carlos, CA (US); Nicolas Popp, Menlo Park, CA (US)

(73) Assignee: Symantec Corporation, Mountain View, CA (US)

( * ) Notice: Subject to any disclaimer, the term of this patent is extended or adjusted under 35 U.S.C. 154(b) by 952 days.

(21) Appl. No.: 12/186,651

(22) Filed: Aug. 6, 2008

(65) Prior Publication Data

US 2010/0037046 A1 Feb. 11, 2010

(51) Int. Cl.
*H04L 29/06* (2006.01)

(52) U.S. Cl.
USPC ............... 713/155; 713/168; 713/193; 726/6; 726/12; 726/35; 380/255

(58) Field of Classification Search .................. 713/155, 713/168, 193; 380/255; 726/6, 12, 35
See application file for complete search history.

(56) References Cited

U.S. PATENT DOCUMENTS

| | | | |
|---|---|---|---|
| 5,684,950 A | 11/1997 | Dare et al. | |
| 6,243,816 B1 | 6/2001 | Fang et al. | |
| 6,421,768 B1 | 7/2002 | Purpura | |
| 6,871,220 B1 * | 3/2005 | Rajan et al. | 709/218 |
| 7,069,440 B2 | 6/2006 | Aull | |
| 7,136,490 B2 | 11/2006 | Martinez et al. | |
| 7,150,038 B1 | 12/2006 | Samar | |
| 7,155,739 B2 * | 12/2006 | Bari et al. | 726/6 |
| 7,246,230 B2 | 7/2007 | Stanko | |
| 7,296,290 B2 | 11/2007 | Barriga et al. | |
| 7,743,404 B1 * | 6/2010 | Deutschmann et al. | 726/2 |
| 2002/0023059 A1 | 2/2002 | Bari et al. | |
| 2002/0023215 A1 * | 2/2002 | Wang et al. | 713/171 |
| 2005/0044423 A1 | 2/2005 | Mellmer et al. | |
| 2005/0097320 A1 | 5/2005 | Golan et al. | |
| 2008/0031447 A1 * | 2/2008 | Geshwind et al. | 380/46 |
| 2008/0077809 A1 * | 3/2008 | Hayler et al. | 713/193 |
| 2008/0114867 A1 | 5/2008 | Thayer et al. | |
| 2008/0114868 A1 | 5/2008 | Thayer et al. | |
| 2008/0114869 A1 | 5/2008 | Thayer et al. | |
| 2008/0133735 A1 | 6/2008 | Thayer et al. | |
| 2008/0162338 A1 * | 7/2008 | Samuels et al. | 705/38 |
| 2009/0100270 A1 * | 4/2009 | Ting | 713/186 |
| 2011/0047606 A1 * | 2/2011 | Blomquist et al. | 726/7 |

OTHER PUBLICATIONS

Botzum, K., Single Sign on—A Contrarian View, 1-8, Aug. 6, 2001.
Curiosity is bliss: Microsoft Passport 101 (May 30, 2008) 1-13, http://blog.monstuff.com/archives/000167.html.
Pashalidis, A. et al., A Taxonomy of Single Sign-On Systems, Information Security and Privacy, 8th Australasian Conference, ACISP 2003, 249-264, Royal Holloway, University of London, http://www.isg.rhul.ac.uk/~xrtc/cv/ssotax.pdf.
Search Report and Written Opinion corresponding to the PCT/US2009/052923 application mailed Sep. 18, 2009.

* cited by examiner

*Primary Examiner* — Harunur Rashid
(74) *Attorney, Agent, or Firm* — Lowenstein Sandler LLP

(57) ABSTRACT

A centralized credential management system includes website credentials that are stored at a vault. The website credentials are encrypted based upon a key not available to the vault and are for authenticating a user to a third party website. Through a client, a user authenticates to the vault and retrieves the encrypted website credentials and parameters and code for properly injecting the credentials into a website authentication form. The website credentials are decrypted at the client and injected into the authentication form using the parameters and code.

10 Claims, 8 Drawing Sheets

CREDENTIAL MANAGEMENT SYSTEM AND METHOD

FIELD OF THE INVENTION

The field of the invention is authentication, in particular authenticating users to third-party websites using credentials stored in a central vault.

BACKGROUND OF THE INVENTION

Many Internet users hold accounts with many websites, providing services or other functionality such as online banking, online auctions, online shopping, social websites and more. Typically a set of credentials is associated with each account, and at least a subset of these credentials, usually consisting of a username and a password, is used by the website to verify a user's identity. More extensive or limited sets of credentials are also used. Websites that provide more sensitive services, such as online banking, can require more credentials, e.g. a date of birth, a social security number or other types of credentials. Less sensitive services may only require a single identifier, such as an e-mail address.

Users can implement certain practices that can increase the security of their credentials. For example, they can use a mix of letters and numbers, change their passwords frequently and not use the same credentials for signing on to different sites.

Some users find such security practices inconvenient. For example, some users to make use of a single username and a single password for many of their online accounts across different websites. A successful data-mining attack on one of the websites where an account is held can grant the attacker access to the rest of the user's online accounts.

One solution to this inconvenience is to centrally manage the sets of credentials such that the user can cause them to be provided to a website for authentication. Centrally managed credentials are said to be managed by or (logically) stored at a "vault." When a user wishes to authenticate to a website, the user interacts with a computer (the "client") to authenticate the user to the vault. The vault can then process a request from the client to authenticate the user to a given website. The vault can look up the credentials stored for the user for the given website and send them to the client, which can submit them to the website to authenticate the user.

What is needed is a way to transparently (to the user) provide the credentials from the vault to the website. If the vault is untrusted, the user credentials can be stored only in an encrypted form at the vault. The key used to encrypt the credentials may be stored at a trusted client or safeguarded by the user. What is needed is an efficient way to transform the encrypted credentials What is also needed is a more sophisticated, layered approach to credentials management.

SUMMARY OF THE INVENTION

In accordance with an embodiment of the present invention, a vault stored website credentials for authenticating a user to a third party website. The website credentials are encrypted based upon a key not available to the vault, thereby reducing the risk that the user's website credentials would be compromised in the event the vault is compromised. When the user wants to authenticate to a website, the user authenticates to the vault using vault credentials and retrieves the encrypted credentials for the website along with parameters and code useful for properly injecting the website credentials into a website authentication form. The encrypted credentials are decrypted at the client and injected into the form, using the parameters and code. The user is then authenticated to the website. These and other features will be more readily understood from the following detailed description of preferred embodiments of the invention that is provided in connection with the accompanying drawings.

BRIEF DESCRIPTION OF THE DRAWINGS

Referring to the exemplary drawings wherein like elements are numbered alike in the accompanying Figures.

DETAILED DESCRIPTION OF THE INVENTION

An embodiment of the invention can authenticate a user to a website. The user can access the website using a client, which can be a personal computer, a mobile phone, a thin client, or any other virtual or physical device capable of conveying information from a website to a user.

Figure 1:
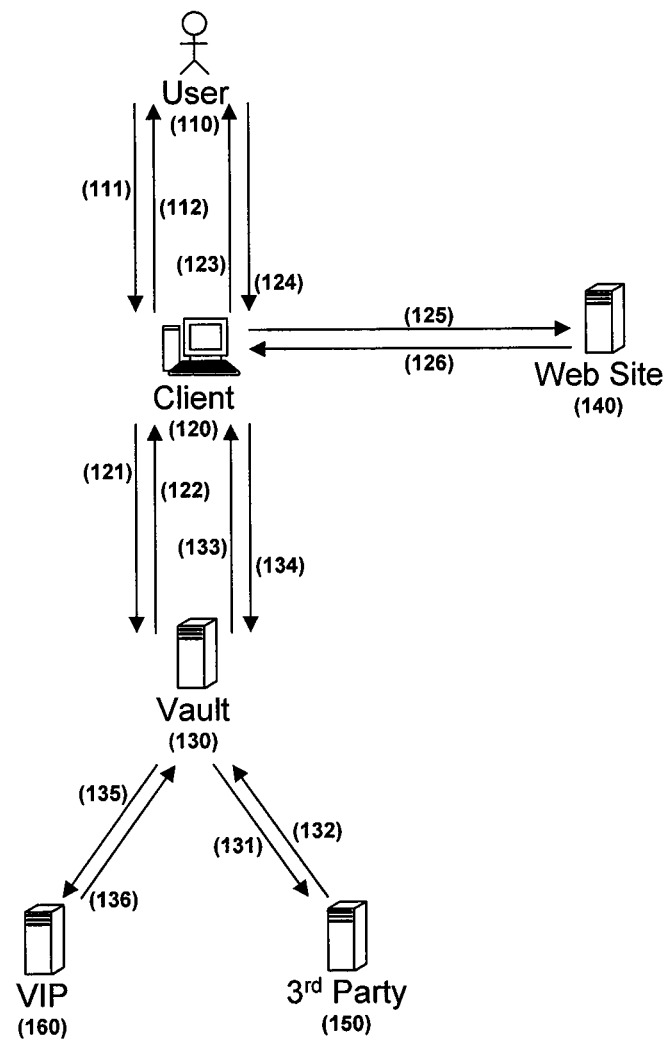
FIG. 1 depicts a system in accordance with an embodiment of the present invention.
Figure 10:
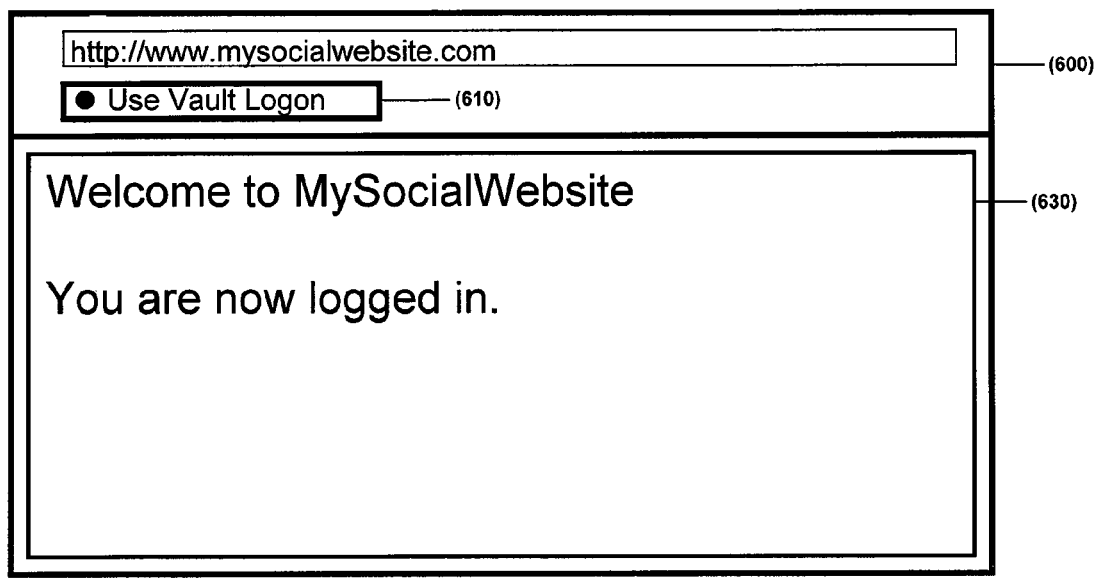
FIG. 10 shows a web browser in a system in accordance with an embodiment of the invention in which content available only upon authentication is rendered.

FIG. 1 shows system and method in accordance with an embodiment of the present invention. User (110) can indicate (111) to client (120) a desire to authenticate the user to a website. The client can send one or more credentials ("vault credentials") to the vault (130) in order to authenticate the user to the vault. Client (120) can also send a request for the credentials ("website credentials") needed to authenticate the user with the website (140). The vault (130) can assess the risk that the requests issue from an unauthorized user based upon various criteria. For example, vault (130) look up the name of the ISP used by the client and requests this from a 3rd party (131), e.g., ARIN. Based upon the ISP name received from the third party (150), vault can accept the vault credentials already provided or request additional credentials to authenticate the user (110). For example, vault (130) can send a request to client (120) that user (110) provide a One-Time Password ("OTP".) The OTP password can be provided by a token, such as the VeriSign VIP Token, by an application at the client (120), or any other suitable source. The client can collect the OTP from the user (123 and 124) and pass it to the vault (134). The vault can send (135) the received OTP to another third party (e.g., the VeriSign VIP network) (160) for verification. Upon receiving the verification result (136), the vault can determine that the risk that the requests from client (120) are fraudulent is too high, in which case the requests for authentication and website credentials can be denied by vault (130.) If vault (130) determines that such risk is sufficiently low, vault can retrieve the requested website credentials and send them (122) to the client, along with parameters to match them to the form elements on an authentication web-form (such as that shown in FIG. 6) associated with the website to which to user desired to authenticate itself. Client (120) can inject the credentials into the authentication web-form and submit (125) the form to the website (140). The response (126) from the website can be rendered and displayed (112) to the user (110) by client (120), e.g., as shown in FIG. 10.

Figure 2:
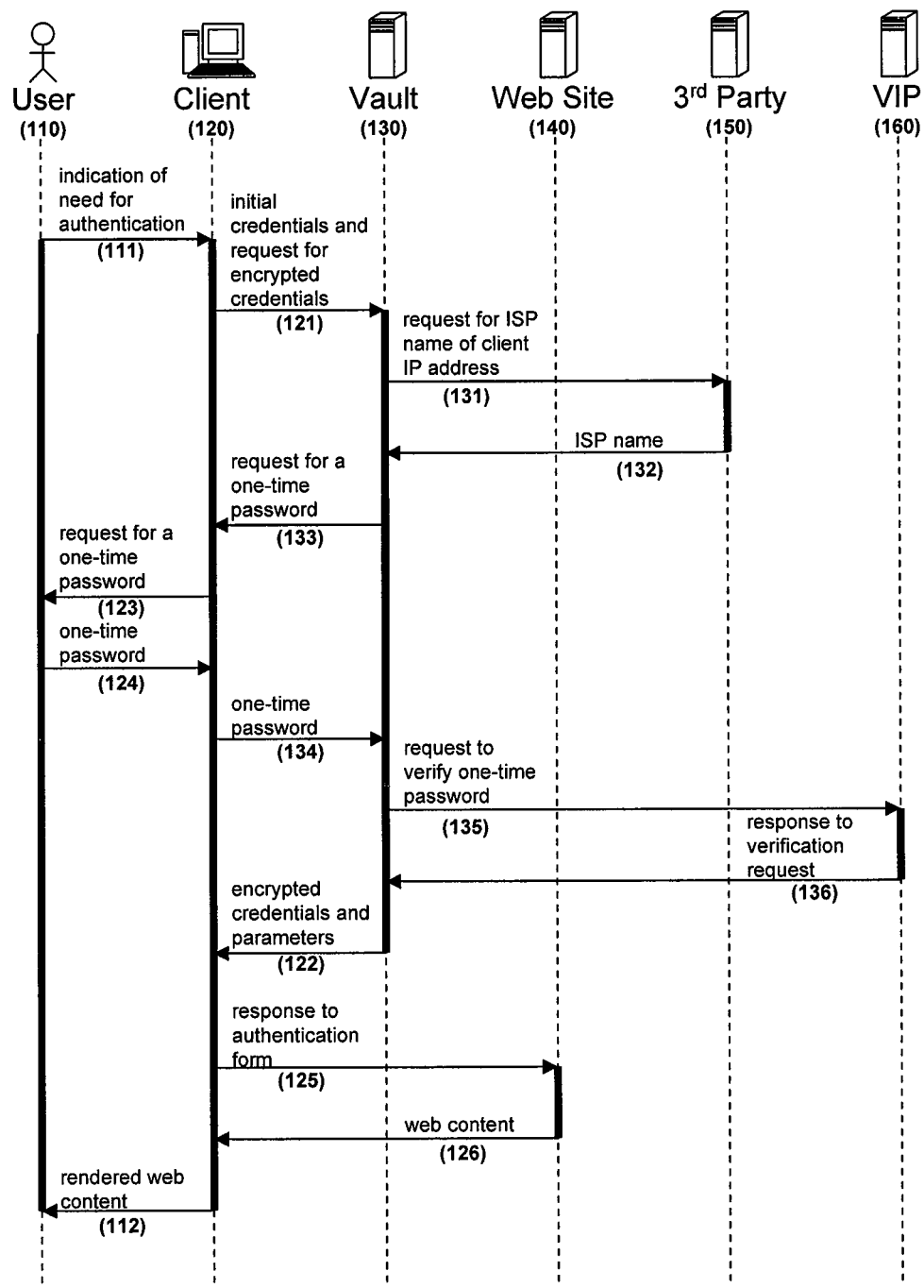
FIG. 2 depicts a protocol diagram in accordance with an embodiment of the present invention.

FIG. 2 shows is a protocol diagram that shows exemplary information flows between system components, which will be discussed in further detail. User (110) can be an entity that interacts with client (120) to authenticate itself to website (140). Examples of a users include a person, a software application, a process executing as part of an application on client (120), etc.

Client (120) can include a processor coupled to a memory storing instructions adapted to be executed by the processor to perform at least part of the method in accordance with an embodiment of the present invention. Examples of a client include a Personal Computer executing a browser and storing a cryptographic key that is used to encrypt the website credentials before they are sent to the vault for storage. The key can be stored as part of a bookmarklet, in RAM, on a hard disk, etc. For example, in the Firefox browser, DOM storage is used, while for Internet Explorer, Microsoft's userData storage facility is used. Safari/Webkit uses a client database implementation based upon an HTML5 draft. Safari/Webkit: uses a client database implementation based on HTML5 draft recommendation. For sites that support the ability to post form data dynamically, a locally stored key can be used to decrypt website credentials without requiring the user to click a bookmarklet. The key is deliberately not sent to the vault. If the user is unable or unwilling to store the key in their browser's local storage, an embodiment of the present invention can default to querying the user to provide the key. The key can be stored on hardware such as a token, a flash memory stick, a SIM card (e.g., in a mobile telephone), etc. The hardware storing the key can be tamper resistant and, in some embodiments, can connect to other devices in any suitable way, such as via a USB connection, via wireless connection (which can be encrypted), etc. In some embodiments, the device storing the key can perform other functions, such as generating a One Time Password.

Other examples of client (120) include a mobile platform (e.g., a cell phone, a PDA, etc.) that can convey information from website (140) to user (110) in any suitable way. Embodiments of the present invention can be implemented on a cell phone. The cell phone can receive a SIM card that stores the key, and software on the SIM card, in the cell phone, or both, can perform the method in accordance with an embodiment of the present invention. For example, the browser on the cell phone can store or access a list or catalog of third party web sites for which the user has stored his credentials at the vault. It can also act as a gateway for the user to provide his authentication credentials to log on to the vault. When the is logged on to the vault and selects a catalogued web site to which to log on, the browser on the phone can retrieve the sign on page from the selected site. It can also retrieve the user's encrypted credentials for the site from the vault, as well as code and/or parameters specific to the sign on page. The cell phone browser can use a key stored on the tamper-resistant SIM card to decrypt the credentials, inject the decrypted credentials into the third party web site log on page using the code and/or parameters and cause the user to be logged on to the third party site.

Website (140) is an example of network-accessible resource that can be provided with user (110) authentication credentials in accordance with embodiments of the present invention. Other examples can include an FTP server, an SMTP (e-mail) server, etc. The present invention can be implemented for any network-accessible resource that authenticates its users. Such resources can permit users (110) to register and maintain accounts. Accessing the resource using the account can grant to user (110) access to otherwise restricted content.

An account on a resource such as a website (140) can be associated with a physical or virtual user (110). One or more credentials can also be associated with the account. This can include information such as the name of the user, a username, the e-mail address of the user, and other information useful to identifying the user (110) and distinguishing the user (110) from other users. The credentials can be stored at the website (140) and/or at other locations, such as at an authentication service. The credentials need not be explicitly stored anywhere, but can be derived from information made available to the verifier.

The credentials needed to authenticate the user (110) to a website (140) may be stored in a vault (130) that can be accessible to the user (110.) The vault (130) can be implemented as an application in any computing environment in accordance with embodiments of the present invention. It can run as a single application on a single computer, or can span across servers in different locations. It is also possible to implement the vault directly in hardware, e.g., using an Application Specific Integrated Circuit. The encrypted credentials may be stored a location different than that at which the vault's credential management software resides. Communication between the vault (130) and the client (120) can occur over a secure connection, such as one that implements SSL.

In accordance with an embodiment of the present invention, once the key has been provided, the user can to add its login credentials for a pre-set list of sites, along with a description of the service offering. Entering of the user credentials can include entries for a username, a password and a brief description of the site in the form of notes. The encrypted data (username/password) can be stored vault database (540), as can a hashed (salted) value of the key for additional verification.

In an embodiment, the xxTEA algorithm or any other encryption algorithm can be used to encrypt the website credentials. This can be implemented in javascript functions that execute on the page, in flash, etc.

Once the user has entered its website credentials and the information saved to the vault database (540) the user can be navigated to a page that can contain the link that the user should add to its bookmarks bar. This link can include the user's website credentials encryption key, which can be visually obfuscated, along with a unique value (an "apikey") that maps the user's username to a specific value that has been generated by the software in accordance with an embodiment of the present invention. This can provide for increased security by assuring that the user authenticated to the vault is mapped to the appropriate user account when using the bookmarklet.

In accordance with embodiments of the present invention, the key can be stored at the client, or provided by the user each time it is needed, retrieved from a trusted location each time it is needed or derived at least partly from information provided by the user or information obtained from a trusted location.

If a user needs to add information to the initial list of websites that may not have be initially entered or edit existing information, an embodiment can include an "edit" button. When user clicks on the edit button, it can be prompted to enter the key used in the setup steps described previously. If the user enters the wrong key, it can be permitted to re-enter the correct value up to a certain number of times before the account is possibly locked, depending on the security policy. This can place the user in an edit mode to add or correct information.

As known in the art, a bookmarklet is an applet, a small computer application, stored as the URL of a bookmark in a web browser or as a hyperlink on a web page. Bookmarklets are designed to add one-click functionality to a browser or web page. When clicked, a bookmarklet performs a function such as a search query or data extraction. Usually the applet is a JavaScript program.

Prior to activating the "one-click" functionality of the bookmarklet, the user should first be authenticated by the vault. If the user is not logged in and the user clicks on the bookmarklet, the user can be redirected to the vault for authentication. Once authenticated, the user can be redirected back to the page where they clicked on the bookmarklet.

Once the user has been authenticated by the vault and the user is on the website authentication page, the user clicks the link contained in the bookmarklet, which injects the form fill code from the vault into the page. In particular, the link can retrieve the encrypted user credentials and form fill parameters for the current login page from the vault using, for example, a JSON-P method. The form fill code can use the key, which can be encoded (obfuscated) in the link, and can be used by the page code to decrypt the user website credentials. The decrypted user credentials (e.g., username, password, etc.) can be inserted into the website authentication form, and the form can be submitted to the website.

If the user has selected the bookmarklet while not on the specific website authentication page, a popup can be displayed that can contain the list of sites for which the user has entered website credentials. The popup can be in the form of HTML/CSS that can be inserted into the displayed page. The user can select the site in the popup and, if it is one-click enabled, the user can be automatically signed in, i.e., authenticated to the selected website. The enabled websites can use a transitional page to authenticate the user in which the key is retrieved from the browser local storage, if available, requested from the user, etc. If the website does not support direct login, the user can be navigated to the site and can then click the bookmarklet again to authenticate to the website.

In accordance with an embodiment of the present invention, a carousel can be used to display the different web sites/pages that the user has enrolled in the vault, i.e., for which the user has stored website credentials at its vault account. The user can visualize in a single place all the different pages, and through a rotation tool, can select a specific page, then click and access that page. An embodiment of the present invention can be enabled with the carousel such that user credentials stored at the vault for a given website are injected into a page retrieved when the user clicks on a graphic representation of such a site in the carousel. In this way, the carousel interface can be used to quickly authenticate to any website listed in the carousel.

In FIG. 2, third party (150) is a network resource that can be used by vault (130) to assess the risk that user (110) is honest or fraudulent. For example, third party (150) can be a resource that provides a reverse DNS lookup service. The IP address received as part of a message from a client (120) containing user (110) vault credentials can be submitted to such a service, which can return a host name, the geographical location of the host, etc. The host name and other information, such as a the geographical data, can be compared to facts known about the user (110) to assess the likelihood that the vault credentials originate from the correct user (110). For example, if it is known that user (110) has historically logged on to the vault from a single given host in the United States, and if the reverse IP lookup reveals a different host name located in Nigeria, vault (130) may decide to request one or more additional credentials to verify that the user is the registrant of the vault account to which access is sought. Likewise, if the server name and location match that in the historical record, then access may be granted without requiring further vault credentials. In some cases, no third party may be needed to help vault (130) to assess the risk of a request for access. For example, vault (130) may assess inherent properties of the request, e.g., the number of such requests received per unit time (an excessively high number could indicate fraud), the number of failed recent attempts (a high number could indicate fraud), etc.

VIP (160) refers to the VeriSign Identity Protection ("VIP") service, which can verify credentials such as a OTP. If the risk assessed by the vault (130) is above a given threshold, the vault (130) can request that the user provide an additional credential such as an OTP. The OTP is received by the vault (130) and then sent to VIP (160) for verification. If VIP sends indicates to the vault that the OTP is successfully verified, then the user (110)/client (120) is granted access to the vault account. Otherwise, access is denied. User (110) may be given another opportunity to submit another OTP or other credential.

Figure 3:
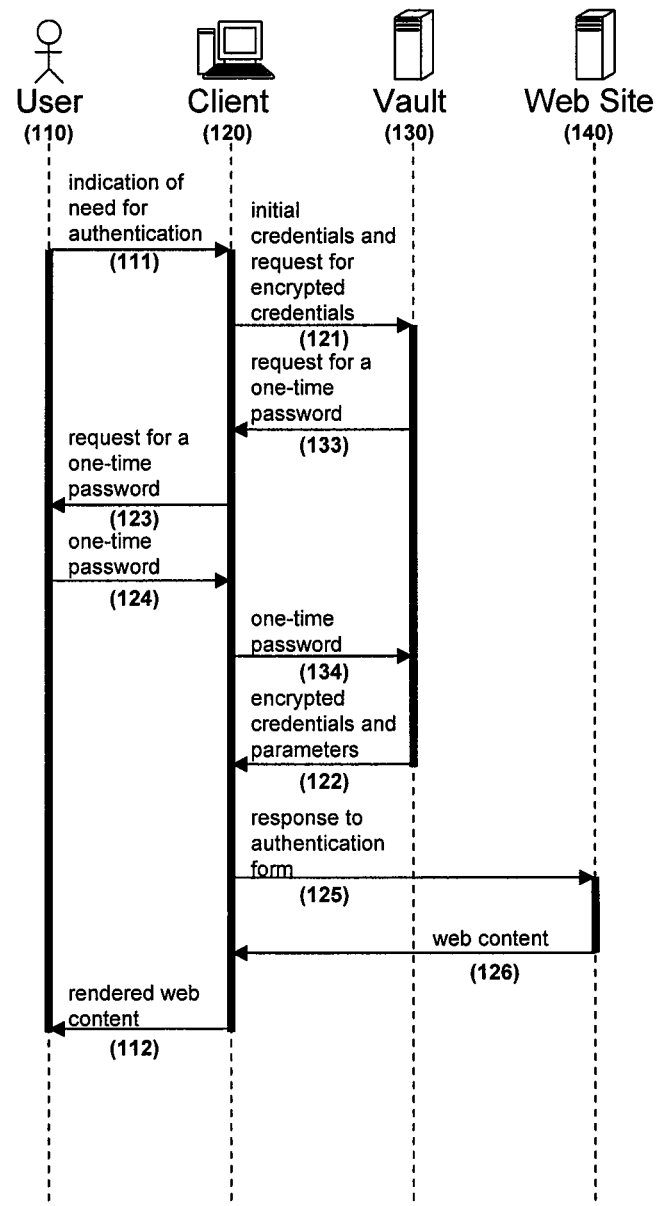
FIG. 3 depicts another protocol diagram in accordance with an embodiment of the present invention.
Figure 4:
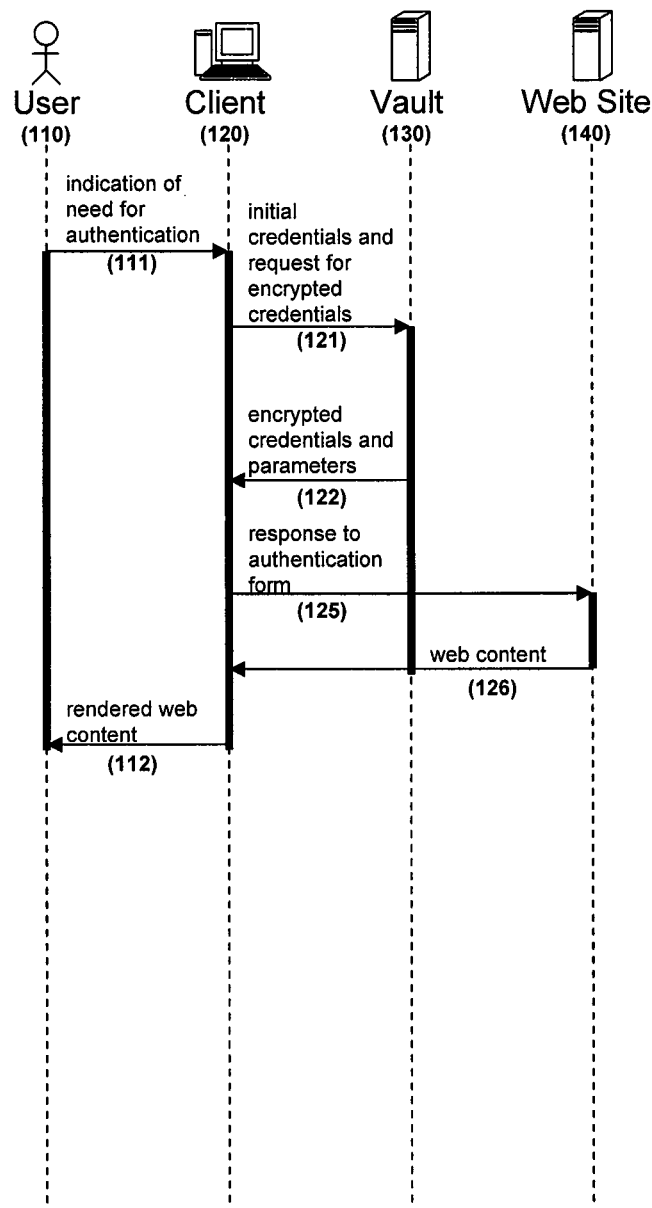
FIG. 4 depicts a another protocol diagram in accordance with an embodiment of the present invention.

FIGS. 3-4 show simplified protocol flows for embodiments in accordance with the present invention. FIG. 3 shows a version of the protocol that operates without invoking other networked resources to evaluate supplemental credentials to authenticate to the vault (130). Rather, the vault (130) itself verifies the OTP. FIG. 4 shows a version of the protocol in which no supplemental credentials are used to authenticate user (110) to vault (130).

Figure 5:
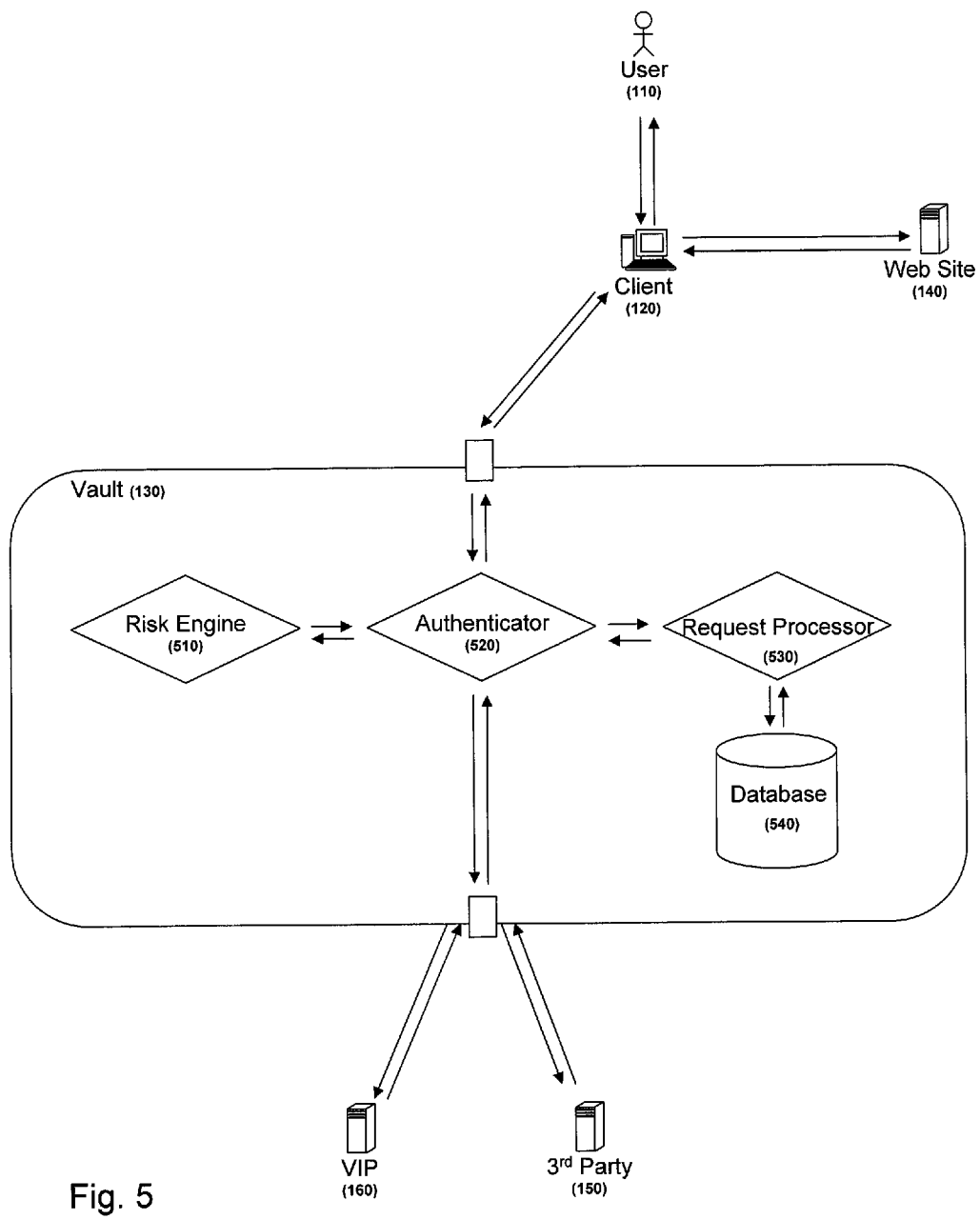
FIG. 5 shows a credential management vault system in accordance with an embodiment of the invention.

FIG. 5 shows a system in accordance with an embodiment of the invention detailing an embodiment of the vault (130). In this embodiment the vault (130) includes an authenticator (520), a risk engine (510), a request processor (530), and a database (540).

A user (110) can request through client (120) to be authenticated to vault (130). In one embodiment, this request is made initially by client (120) to vault (130). In another embodiment, user (110) indicates to client (120) that it wants to authenticate itself to a website (140). Client (120) sends a request for website credentials to vault (130), which determines that user (110) is not presently authenticated to vault (130) and sends a request for vault credentials to client (120). In both cases, user (110) submits vault credentials to vault (130) through client (120).

Authenticator (520) can verify the vault credentials and can pass the results of the verification as well as information obtained from communications with client (120) (such as the source IP address used by client (120)) to risk engine (540). Authenticator (520) can also obtain additional information from a networked, third party resource (150) (such as the hostname associated with the client via a reverse IP lookup) and pass such information to the risk engine (510). Based upon the information provided by authenticator (520), risk engine (510) can determine the risk that the authentication request is fraudulent, and pass the result to authenticator (520). The risk can be quantified in any suitable way, e.g., high/low, a numerical value, etc. Authenticator (520) can store a risk threshold that can be unique to a user, unique to a given type of users, or the same for all users. Authenticator (520) can compare the determined risk to the risk threshold. If the determined risk is above that of the threshold, authenticator (520) can request one or more additional credentials from user (I 10)/client (120), such as an OTP. Authenticator (520) can submit the OTP to a networked resource, such as the VeriSign Identity Protection (VIP) server (160). The results of the verification can be passed to the risk engine (510). If and when the determined risk is lower than the threshold, then the user (110) is authenticated to the vault and the user (110) request for credentials can be passed to request processor (530).

Request processor (530) can be communicatively coupled to database (540). Database (540) can store user (110) account information, which can include a user identifier, one or more credentials correlated with a website to which they pertain, parameters useful to the client for properly injecting the credentials into an authentication form for the website. It can also contain executable code that can be sent to client (120) to assist in completing the authentication form. The credentials stored in database (540) can be encrypted based upon a key not available to vault (130). The key can be available to the client, which can encrypt the credentials before they are sent to vault (130) and decrypt the encrypted credentials received from vault (130) before providing them to website (140). The key can be stored in a bookmarklet at client (120), be otherwise stored at client (120) (e.g., in RAM, flash memory, hard disk, etc.), derived from user-provided credentials at client (120), etc. Request processor can retrieve credentials, parameters and/or code for the website (140) and send them to the client (120).

In accordance with embodiments of the present invention, the risk threshold can be adjusted based upon the type or identity of the website (140) for which a user (110) has requested credentials. The thresholds can be stored at database (540) correlated with the websites (140) or website types to which they pertain. A determined risk of a user authentication may be below a risk threshold for a first website and above a risk threshold for a second site. If the user (110) has authenticated to the vault (130) to authenticate to the first website and then requests website credentials for the second website, vault (130) can request that user (110) provide additional credentials to lower the determined risk below that of the risk threshold that corresponds to the second website.

Figure 6:
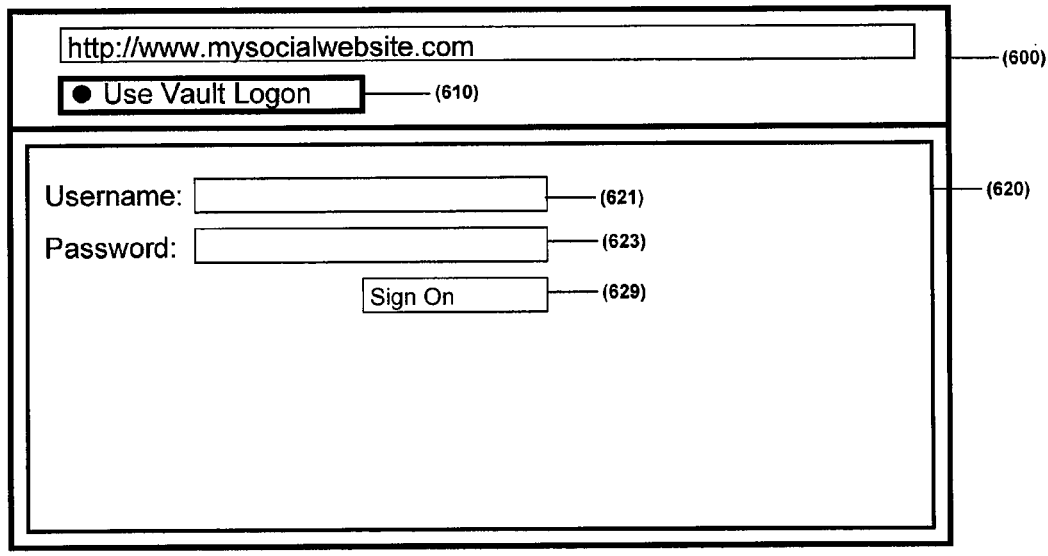
FIG. 6 shows a web browser in a system in accordance with an embodiment of the invention in which a web authentication form is rendered, and in which a bookmarklet that implements the method is installed.

FIG. 6 shows an authentication form (620) for a website (140) rendered in a web browser (600). An authentication in accordance with an embodiment of the present invention can be triggered by user (110) selecting bookmarklet (610). A request is sent to vault (130) for website credentials. If the user is already authenticated to the vault (130), the vault will retrieve the encrypted credentials from database (540) and send them to client (120) along with code and parameters for completing form (620). Client (120) will decrypt the credentials and can use the code to inject the decrypted credentials in the form (620) and provide the completed form (620) to the website (140). The user (110) can thus be authenticated to the website (140).

Figure 7:
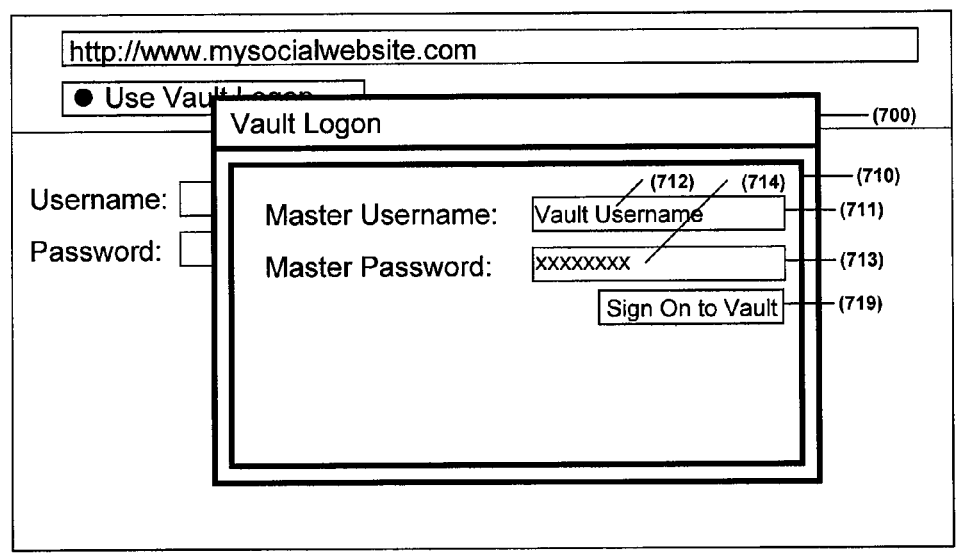
FIG. 7 shows a web browser in a system in accordance with an embodiment of the invention in which a request for initial credentials from the user is displayed.

If the user (110) is not presently authenticated to the vault (130), the vault (130) can send a request for vault credentials to client (120). FIG. 7 shows vault credentials request form (700) that includes a username (712) and a password (714) field that user (110) completes to authenticate to the vault. User (110) selects the "Sign On to Vault" button (729) after completing the fields and can be logged on to the vault.

Figure 8:
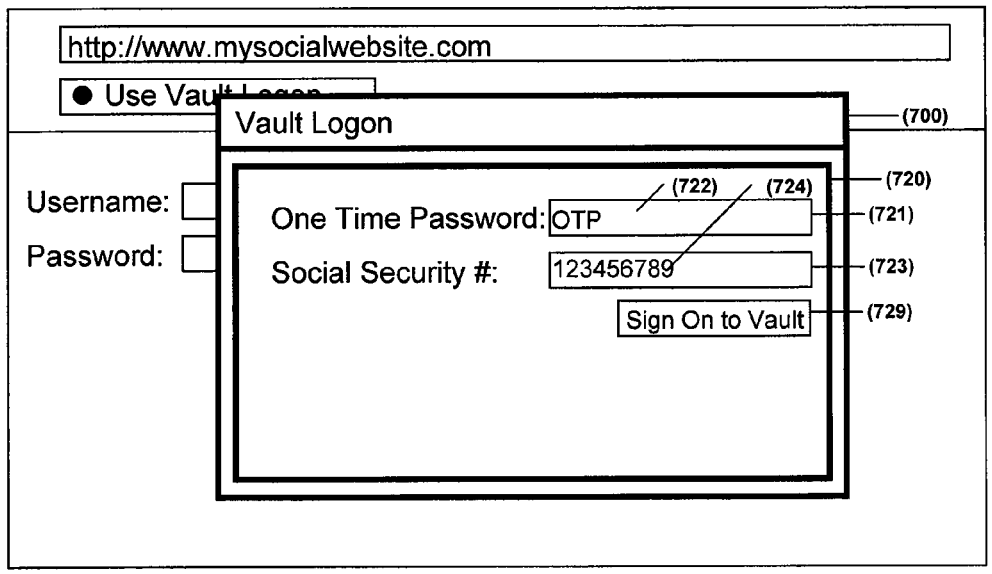
FIG. 8 shows a web browser in a system in accordance with an embodiment of the invention in which a request for additional credentials from the user is displayed.

If the risk of a vault authentication is above a given risk threshold, the vault can request one or more additional credentials, such as the OTP requested in the vault supplemental credential request form (730) shown in FIG. 8. The form (730) includes fields for a OTP (722) and a social security number (724). User (110) selects the "Sign On to Vault" button (729) after completing the fields and can be logged on to the vault.

Figure 9:
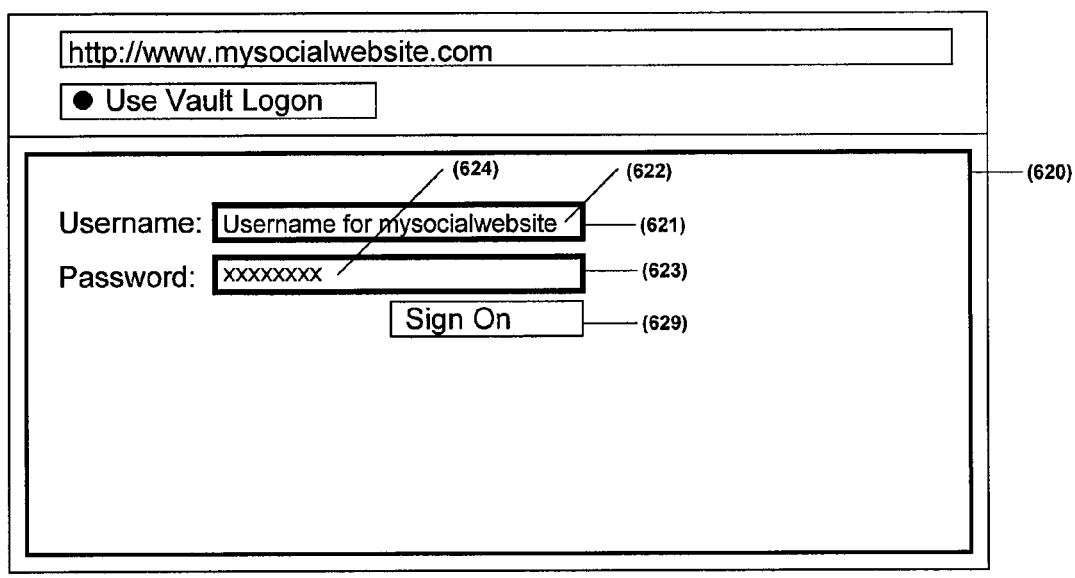
FIG. 9 shows a web browser in a system in accordance with an embodiment of the invention in which a web authentication form is rendered, into which received and decrypted credentials have been injected.

FIG. 9 shows the credentials (622 and 624) retrieved from the vault, decrypted at the client injected into the form-elements (621 and 623) on the authentication web-form (620). User (110) can select the "Sign On" button (629) after completing the fields and can be logged on to the vault.

FIG. 10 shows a web-browser (600) displaying content (630) from a web site that is only available after authentication.

In accordance with an embodiment of the present invention, a user (110) can provide website credentials to a vault (130) by registering with the vault (130). Registration can include establishing user vault credentials and establishing a user vault account. User (110) can manually enter user website credentials (e.g., a user identifier and a password) at the client (120) to be sent to the vault (130). Client (120) can include software that encrypts the website credentials using a key that can be supplied by the user, generated by the client software, derived by the client software from information provided by the user, such as credential information or received and stored at the client (120). Once encrypted, the website credentials can be sent to the vault (130) to be stored at database (540), associated with user information, such as a user identifier, user vault credentials, website authentication form parameters and code, etc. Likewise, code at the client (120) can cause website credentials provided manually by user (110) in filling out website authentication forms to be collected, encrypted and sent to vault (130) to be stored in the user's vault account, provided the user (110) is authenticated to the vault (130).

Those skilled in the art that will appreciate that there are a number of ways of implementing the authentication procedure at a client and that there correspondingly will be numerous ways for the client to receive an indication to provide credentials and to collect the credentials.

When the client (120) retrieves the website credentials from the vault (130) to supply to a website (140), the vault (130) can send the website credentials to the requesting client (120) in the encrypted form in which they were originally submitted. Any suitable encryption algorithm can be used, such as blowfish, AES, DSA and the like.

The website credentials can be passed to the client (120) as key/value pars, where can key represent the name of the form-element (e.g. 621 and 623) on the authentication web form (620) into which the value (e.g. 622 and 624) should be injected.

In one embodiment, the client (120) can use the HTML Document Object Model (DOM) search for form-elements in the web authentication form to find elements with names matching the form-element keys in the pairs received from the server, and then change the value of the form elements using the DOM application programming interface. This can be done using JavaScript, but it is also possible to implement as a browser plug-in, or by other means of integration.

In another embodiment, the HTML data constituting the web authentication form can be intercepted, and the HTML code can be modified so that the values are inserted into the corresponding HTML form-elements before the form is rendered at the client.

While the data constituting the form can be encoded as HTML, other encodings can be used, including but not limited to XHTML and WML.

As the authentication web forms used to access websites can change, in one embodiment of the invention, the vault can maintain knowledge about various authentication forms in the form of a library, and changes the form-element keys before passing the pairs to the client. The library can store information about the names of fields for authentication forms used for a wide range of websites that can be of interest to users of the system. It can also store the code that can help properly inject the website credentials into such forms. The library information can be stored in database (540).

Some authentication web forms can require a more complicated procedure at the client than passage of variables through a single web-form to authenticate a user. For example, some online banks use a multi-page authentication procedure. In order to ensure proper authentication to these sites, the vault can pass a piece of code (such as JavaScript) along with the credentials that will conduct the authentication as needed for the particular website. Typically the vault will maintain pieces of code customized to each of these sites.

In some cases, the key encrypting the user website credentials will change. In accordance with an embodiment of the present invention, the encryption of the website credentials at the vault can also be changed. A message can be sent from client (120) to vault (130) indicating that the key has changed for a user (110). In response, vault (130) can send all of the website credentials stored in the user account, which are encrypted using the old key. Client (120) can use the old key to decrypt the website credentials received from vault (130) and then use the new key to re-encrypt the credentials. Client (120) can then send the website credentials encrypted with the new key to vault (130) for storage in the vault account. In this way, user website credentials encrypted with an outdated key can be efficiently replaced by website credentials encrypted with a current key.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method comprising:
   storing, within a vault account at a vault system, at least one encrypted website credential that is encrypted using an encryption key that is not available to the vault system, wherein the encrypted website credential is for authenticating a user to a third party website;
   sending, to a client device, executable code for storing a bookmarklet link at the client device, wherein the bookmarklet link stores the encryption key and an application program interface (API) key, wherein the executable code obfuscates the stored encryption key within the bookmarklet link, and wherein a processor at the client device executes the executable code;
   receiving, from the client device, at least one first vault credential to authenticate the user with the vault account;
   authenticating the first vault credential;
   assessing a risk that the first vault credential is not authentic, wherein assessing the risk comprises quantifying the risk;
   comparing the quantified risk to a threshold to determine that the quantified risk is greater than the threshold;
   requesting, from the client device and in response to the determination that the quantified risk is greater than the threshold, at least one second vault credential to authenticate the user with the vault account, wherein the second vault credential is distinct from the first vault credential;
   authenticating the second vault credential;
   receiving, from the client device, a request for the encrypted website credential as a result of a user selection of the bookmarklet link at the client device, wherein the request includes the API key;
   authenticating the API key;
   retrieving the requested encrypted website credential from the vault account at the vault system; and
   sending, to the client device, the requested encrypted website credential and at least one form fill parameter in response to successfully authenticating the first vault credential, the second vault credential, and the API key, wherein the executable code decrypts the requested encrypted website credential into a decrypted website credential using the obfuscated stored encryption key, and wherein the executable code uses the form fill parameter to inject the decrypted website credential into at least one form field in an authentication page of the third party website.

2. The method of claim 1, wherein the first vault credential includes a username and a password.

3. The method of claim 1, wherein assessing the risk is based on one or more of a name of an Internet service provider of the client device, a hostname of the client device, a geographic location of the client device, a number of authentication requests per unit time from the client device, an identity of the third party website, or a type of the third party website.

4. The method of claim 3, wherein requesting the second vault credential comprises requesting a third party a one-time password from the client device.

5. The method of claim 4, wherein authenticating the second vault credential comprises sending the one-time password to a networked resource to be verified and receiving results from the networked resource indicating that the one-time password is verified.

6. The method of claim 1, wherein requesting the second vault credential comprises sending, to the client device, a challenge question and requesting from the client device a response that is based upon the challenge question.

7. A system comprising:
a memory to store, within a vault account at a vault system, at least one encrypted website credential that is encrypted using an encryption key that is not available to the vault system, wherein the encrypted website credential is for authenticating a user to a third party website;
a server processor coupled to the memory to:
send, to a client device, executable code for storing a bookmarklet link at the client device, wherein the bookmarklet link stores the encryption key and an application program interface (API) key, wherein the executable code obfuscates the stored encryption key within the bookmarklet link, and wherein a client processor at the client device executes the executable code;
receive, from the client device, at least one first vault credential to authenticate the user with the vault account;
authenticate the first vault credential;
assess a risk that the first vault credential is not authentic, wherein assessment of the risk comprises quantification of the risk;
compare the quantified risk to a threshold to determine that the quantified risk is greater than the threshold;
request, from the client device and in response to the determination that the quantified risk is greater than the threshold, at least one second vault credential to authenticate the user with the vault account, wherein the second vault credential is distinct from the first vault credential;
authenticate the second vault credential;
receive, from the client device, a request for the encrypted website credential as a result of a user selection of the bookmarklet link at the client device, wherein the request includes the API key;
authenticate the API key;
retrieve the requested encrypted website credential from the vault account at the vault system; and
send, to the client device, the requested encrypted website credential and at least one form fill parameter in response to successful authentication of the first vault credential, the second vault credential, and the API key, wherein the executable code decrypts the requested encrypted website credential into a decrypted website credential using the obfuscated stored encryption key, and wherein the executable code uses the form fill parameter to inject the decrypted website credential into at least one form field in an authentication page of the third party website.

8. The system of claim 7, wherein assessment of the risk is based on one or more of a name of an Internet service provider of the client device, a hostname of the client device, a geographic location of the client device, a number of authentication requests per unit time from the client device, an identity of the third party website, or a type of the third party website.

9. A method comprising:
sending, to a vault system, at least one encrypted website credential that is encrypted using an encryption key that is not available to the vault system, wherein the encrypted website credential is for authenticating a user to a third party website, and wherein the vault system stores the encrypted website credential within a vault account;
receiving, at a client device from the vault system, executable code for storing a bookmarklet link at the client device, wherein the bookmarklet link stores the encryption key and an application program interface (API) key, wherein the executable code obfuscates the stored encryption key within the bookmarklet link;
executing, by a processor at the client device, the executable code to store the bookmarklet link at the client device;
receiving, at the client device, an indication to provide the encrypted website credential;
sending, from the client device to the vault system, at least one first vault credential to authenticate the user with the vault account;
sending, from the client device to the vault system, at least one second vault credential to authenticate the user with the vault account in response to an assessment of a quantification of a risk that the first vault credential is not authentic and a comparison of the quantified risk to a threshold to determine that the quantified risk is greater than the threshold, wherein the second vault credential is distinct from the first vault credential;
sending, from the client device to the vault system, a request for the encrypted website credential in response to a user selection of the bookmarklet link at the client device, wherein the executable code includes the API key in the request;
receiving, at the client device from the vault system, the requested encrypted website credential and at least one form fill parameter in response to a successful authentication of the first vault credential, second vault credential, and the API key;
executing, at the client device, the executable code to decrypt the received encrypted website credential into a decrypted website credential using the obfuscated stored encryption key; and
executing, by the processor at the client device, the executable code to inject the decrypted website credential into at least one form field of an authentication page of the third party website using the form fill parameter.

10. A non-transitory computer-readable medium comprising computer-readable instructions for causing a processor to perform operations comprising:
sending, to a vault system, at least one encrypted website credential that is encrypted using an encryption key that is not available to the vault system, wherein the encrypted website credential is for authenticating a user to a third party website, and wherein the vault system stores the encrypted website credential within a vault account;
receiving, at a client device from the vault system, executable code for storing a bookmarklet link at the client device, wherein the bookmarklet link stores the encryption key and an application program interface (API) key, wherein the executable code obfuscates the stored encryption key within the bookmarklet link;
executing, by the processor at the client device, the executable code to store the bookmarklet link at the client device;
receiving, at the client device, an indication to provide the encrypted website credential;
sending, from the client device to the vault system, at least one first vault credential to authenticate the user with the vault account;
sending, from the client device to the vault system, at least one second vault credential to authenticate the user with the vault account in response to an assessment of a quantification of a risk that the first vault credential is not authentic and a comparison of the quantified risk to a threshold to determine that the quantified risk is greater than the threshold, wherein the second vault credential is distinct from the first vault credential;

sending, from the client device to the vault system, a request for the encrypted website credential in response to a user selection of the bookmarklet link at the client device, wherein the executable code includes the API key in the request;

receiving, at the client device from the vault system, the requested encrypted website credential and at least one form fill parameter in response to a successful authentication of the first vault credential, second vault credential, and the API key;

executing, by the processor at the client device, the executable code to decrypt the received encrypted website credential into a decrypted website credential using the obfuscated stored encryption key; and executing, at the client device, the executable code to inject the decrypted website credential into at least one form field of an authentication page of the third party website using the form fill parameter.

* * * * *